(12) United States Patent
Gless

(10) Patent No.: US 9,421,924 B2
(45) Date of Patent: Aug. 23, 2016

(54) SAFETY SYSTEM FOR VEHICLES FOR REDUCING THE DANGER OF AN ELECTRIC SHOCK FROM A BATTERY

(71) Applicants: Robert Bosch GmbH, Stuttgart (DE); Samsung SDI Co., Ltd., Yongin-si, Gyeonggi-do (KR)

(72) Inventor: Michael Gless, Stuttgart-Zazenhausen (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 438 days.

(21) Appl. No.: 13/961,119

(22) Filed: Aug. 7, 2013

(65) Prior Publication Data

US 2014/0042806 A1 Feb. 13, 2014

(30) Foreign Application Priority Data

Aug. 9, 2012 (DE) .......................... 10 2012 214 114

(51) Int. Cl.
*H02H 11/00* (2006.01)
*B60L 3/04* (2006.01)
(Continued)

(52) U.S. Cl.
CPC .............. *B60R 16/02* (2013.01); *B60L 3/0046* (2013.01); *B60L 3/0069* (2013.01); *B60L 3/04* (2013.01); *B60L 11/1816* (2013.01); *B60L 11/1846* (2013.01); *B60L 11/1877* (2013.01); *H02H 11/00* (2013.01); *Y02T 10/7005* (2013.01); *Y02T 10/705* (2013.01); *Y02T 10/7011* (2013.01); *Y02T 10/7072* (2013.01); *Y02T 10/7094* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC .......... H02H 11/00; B60L 3/04; B60R 16/02
USPC ........................................................ 307/10.1
See application file for complete search history.

(56) References Cited

U.S. PATENT DOCUMENTS 5,757,595 A   5/1998 Ozawa et al.
7,612,524 B2 * 11/2009 Howell ................ H02J 7/1438
                                                           320/104

(Continued)

FOREIGN PATENT DOCUMENTS

CN          202230958 U    5/2012
DE     10 2009 057 007 B4   1/2012

(Continued)

*Primary Examiner* — Hal Kaplan
(74) *Attorney, Agent, or Firm* — Maginot, Moore & Beck LLP

(57) ABSTRACT

A safety system for vehicles for reducing the danger of an electric shock from a battery is described, wherein the safety system is arranged on the outside of the vehicle and has an operator control area and a charging plug-in location with an operating plug. It is characteristic that the operating plug and the charging plug-in location are combined with one another outside the vehicle and are embodied in such a way that removing the operating plug causes the voltage of the vehicle to be disconnected. In addition, the disclosure relates to a motor vehicle which contains such a battery and to a method for reducing the danger of an electric shock from a battery, which method serves to implement the battery according to the disclosure.

12 Claims, 2 Drawing Sheets

(51) Int. Cl.
*B60R 16/02* (2006.01)
*B60L 3/00* (2006.01)
*B60L 11/18* (2006.01)

(56) References Cited

U.S. PATENT DOCUMENTS

| | | | | |
|---|---|---|---|---|
| 7,795,759 | B2* | 9/2010 | DuBose | H02J 9/005 |
| | | | | 307/126 |
| 8,063,757 | B2* | 11/2011 | Frey | B60L 3/0069 |
| | | | | 340/438 |
| 8,994,210 | B2* | 3/2015 | Basheer | B60L 11/1803 |
| | | | | 307/10.1 |
| 2006/0164221 | A1* | 7/2006 | Jensen | B60Q 1/525 |
| | | | | 340/435 |

FOREIGN PATENT DOCUMENTS

| | | |
|---|---|---|
| JP | 2010-161910 A | 7/2010 |
| WO | 2011/066968 A1 | 6/2011 |

\* cited by examiner

SAFETY SYSTEM FOR VEHICLES FOR REDUCING THE DANGER OF AN ELECTRIC SHOCK FROM A BATTERY

This application claims priority under 35 U.S.C. §119 to patent application no. DE 10 2012 214 114.6, filed on Aug. 9, 2012 in Germany, the disclosure of which is incorporated herein by reference in its entirety.

The present disclosure relates to a safety system for vehicles for reducing the danger of an electric shock from a battery. The safety system has an operator control area on the outside of the vehicle and a charging plug-in location with an operating plug. The operating plug and the charging plug-in location are combined with one another here outside the vehicle and are embodied in such a way that removing the operating plug causes the voltage of the vehicle to be disconnected.

In addition, the disclosure relates to a motor vehicle which contains such a battery, and to a method for reducing the danger of an electric shock from a battery, which method serves to implement the battery according to the disclosure.

BACKGROUND

It is becoming apparent that in the future new battery systems, on which very high demands are made in terms of reliability, safety, performance and service life, will be used in stationary applications such as wind-power plants, in motor vehicles which are embodied as hybrid motor vehicles or electric motor vehicles and in electronic equipment such as laptops or mobile phones.

Lithium-ion batteries will play a key role in the electrification of the drive system. As in most other electrical energy accumulators, in lithium-ion batteries the performance and durability are also dependent on the temperature. At low temperatures, the charging capability and the extraction of energy are limited, while at high temperatures the energy accumulator ages more quickly. Even with future battery technologies there is expected to be a certain dependence upon the temperature.

Such lithium-ion cells usually comprise an electrode which can reversibly embed lithium ions in the course of what is referred to as intercalation or can export them again in the course of what is referred to as deintercalation. Intercalation takes place during the charging process of the battery cell, and the deintercalation takes place during the discharging of the battery cell in order to supply current to electric assemblies.

Owing to the relatively high energy density, lithium-ion batteries are used in a variety of ways. Lithium-ion technology is predestined for a wide field of application. It is characterized, inter alia, by high energy density and extremely low self-discharging.

High driving power levels of electric vehicle drives require high electrical voltages or currents from the accumulator and electric machines. The safety of the vehicle occupants and, in particular, of emergency services has to be ensured in all situations, for example even in the event of a fault due to damage to the cables or to a reduction in the distances from voltage-conducting parts.

The service device which is used according to the prior art and regulations is in itself not sufficient to ensure the safety of the vehicle occupants. The service device is provided for maintenance purposes and is mounted in a concealed manner on the vehicle with the result that the service device usually can only be actuated after the vehicle is touched.

The service device itself is often very difficult to access since it is mounted on the battery housing itself. The battery housing is mounted with a low center of gravity (for example the underfloor of the vehicle) owing to the driving dynamics and driving stability (for example the tendency to tilt during the calibration test).

DE 10 2009 057 007 B4 discloses a vehicle, in particular a hybrid vehicle and/or an electric vehicle, having a controllable main switch for a voltage supply and a fuse which protects the main switch against unauthorized operator control. The operator control is carried out outside the vehicle. Furthermore, the vehicle has a fuse disconnecting means which disconnects and/or switches off the fuse and therefore authorizes operator control of the main switch if an accident and/or service failure are/is detected.

SUMMARY

One or more problems of the prior art are overcome or at least alleviated by the present disclosure. According to the disclosure, a safety system for vehicles for reducing the danger of an electric shock from a battery is made available, wherein the safety system is arranged on the outside of the vehicle and has an operator control area and a charging plug-in location with an operating plug. It is characteristic that the operating plug and the charging plug-in location are combined with one another outside the vehicle and are embodied in such a way that removing the operating plug causes the voltage of the vehicle to be disconnected or that detection of an object by a proximity sensor causes the voltage of the vehicle to be disconnected.

In the present disclosure, the battery is a lithium-ion battery. By using the lithium-ion technology it is possible to achieve particularly high energy storage densities, which provides further advantages, particularly in the field of electromobility.

The disclosure is based on the realization that in the present disclosure the operating plug and the charging plug-in location are combined with one another outside the vehicle, and removing of the operating plug causes the voltage of the vehicle to be disconnected. As a result of the fact that the operating plug and the charging plug-in location are combined with one another, the battery can be securely disconnected from the vehicle without touching the vehicle. In other words, the combination of the operating plug and of the charging plug-in location optimizes the disconnection of a battery from the vehicle and therefore ensures reliable disconnection of the battery.

On the one hand, there is a mechanical connection between the operator control area and the operating plug. The operating plug is actuated by opening the operator control area. On the other hand, the operator control area or the operating plug can be secured against being switched on again. This is because intentional and unintentional switching on again of the safety system by uninvolved parties, for example during maintenance, is to be avoided. For this reason, the safety system can be removed/actuated by use of a particular tool or as a software solution by inputting a key or password at the operator control area.

One advantage of the present disclosure is that by combining the operating plug and the charging plug-in location the danger of an electric shock from a battery is reduced. On the other hand, the disconnection of the battery from the vehicle is simplified. A further advantage of the present disclosure is that as a result the engine hood or the trunk of the vehicle does not need to be opened in order to reliably disconnect the battery from the vehicle but instead merely a type of fuel tank flap must be opened, which is preferably composed of electrically nonconductive material.

A further advantage of the present disclosure is that the disconnection of the voltage on the basis of the detection of an object by the proximity sensor additionally improves the safety for persons who approach the vehicle.

In addition, it is advantageous that first-aiders do not have to wear high-voltage gloves in order to disconnect the battery from the vehicle. Another advantage is that the combination of the operating plug and charging plug-in location makes standardization/regulation of a uniform position on different vehicles more easily possible. For example, the safety system can be provided on the right-hand side of a vehicle at an ergonomic height. The advantage is that a uniform location, which can be seen clearly from the outside, and which is known, for example, to the rescue personnel, is determined instead of a specific position on different vehicles. As a result, the rescue personnel or emergency personnel can easily open the interlock without having to touch conductive vehicle components. The safety system can be additionally protected against switching on again.

A further advantage is that even at the end of the battery service life, before the recycling of a vehicle, discharging of the battery can be activated, which reduces the danger of an electric shock from the battery. An optimized safety system, which does not entail any additional costs for additional safety means, is also advantageously made available. Another advantage is that additional functions such as, for example, protection against misuse or an immobilizer can be integrated. In addition the safety system can be provided with a cover or can be embodied in an open fashion in a design integrated into the vehicle. Furthermore, the complexity is advantageously reduced.

According to one advantageous refinement, the operator control area is embodied from electrically nonconductive material. As a result, possible danger of an electric shock from a battery is advantageously prevented and safety is thereby improved.

According to one preferred embodiment there is provision that the operator control area is a visual display. The visual display advantageously displays potentials hazards and provides action instructions to emergency services.

According to a further preferred embodiment it is provided that the operator control area is embodied with visual monitoring. As a result it is advantageously detected whether there is danger and whether disconnection of the voltage has taken place.

In a particular embodiment there is also provision that the operator control area is arranged mirror-symmetrically with respect to the charging plug-in location. The advantage here is that the safety system is optimized and simplified.

Alternatively, there is advantageously provision that the operator control area displays the state of the system and outputs color signals, flashing signals and/or sound signals. As a result, danger instructions and warnings are advantageously output so that in an emergency rescue services can act quickly. In addition, this advantageously improves safety.

According to a further refinement, the operating plug and the battery are connected to a connecting unit. The advantage here is that the possibility of an electric shock from the battery is reduced as a result and accordingly also safety is improved.

In a further embodiment there is provision that the battery is disconnected by means of a signal interlock and/or supply interlock. As a result, a defined safe state is advantageously brought about.

According to an advantageous embodiment, the proximity sensor is an ultrasonic sensor or a radar sensor or an optical sensor, in particular a camera.

According to the disclosure, a motor vehicle having a battery and a safety system is additionally made available, wherein the battery is connected to a drive system of the motor vehicle.

The present disclosure also relates to a method for reducing the danger of an electric shock from a battery, by means of a safety system, wherein the safety system has an operator control area which can be operated from outside the vehicle, a charging plug-in location and an operating plug, comprising the step: removing the operating plug from the charging plug-in location for the disconnection of the voltage, wherein the removal of the operating plug opens a contactor, as a result of which the high-voltage and the low-voltage current are mechanically disconnected with the result that the battery is reliably disconnected from the vehicle in the case of an accident and/or a system fault.

Further advantageous developments are described in the description.

BRIEF DESCRIPTION OF THE DRAWINGS

An exemplary embodiment of the disclosure will be explained in more detail on the basis of the following description and of the drawings, in which.

DETAILED DESCRIPTION

Figure 1:
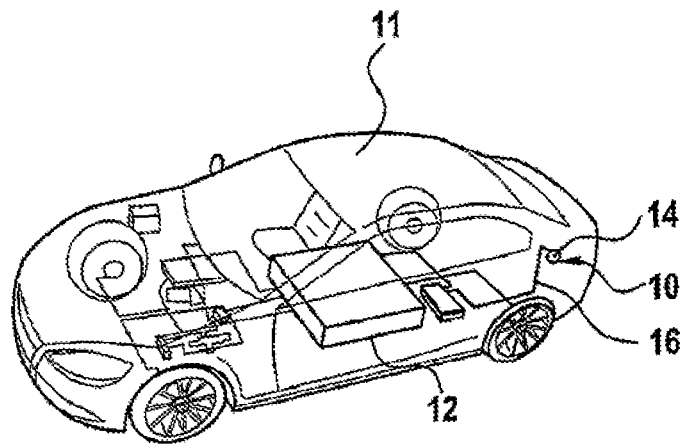
FIG. 1 shows a schematic illustration of the safety system according to the disclosure.

FIG. 1 shows a schematic illustration of the safety system 10 according to the disclosure for reducing the danger of an electric shock from a battery 12. FIG. 1 shows the interior of a vehicle 11. The battery 12 is mounted here on the underfloor of the vehicle 11. The safety system 10 is provided at an easily accessible location.

This uniform, ergonomically easily accessible, accustomed location serves not only for charging the vehicle 11 but also for opening the interlock without having to touch conductive vehicle components. The operating plug 15 and the battery 12 are connected to a connecting unit 16. As a result, the danger of an electric shock from a battery is reduced and safety is additionally improved.

Figure 2:
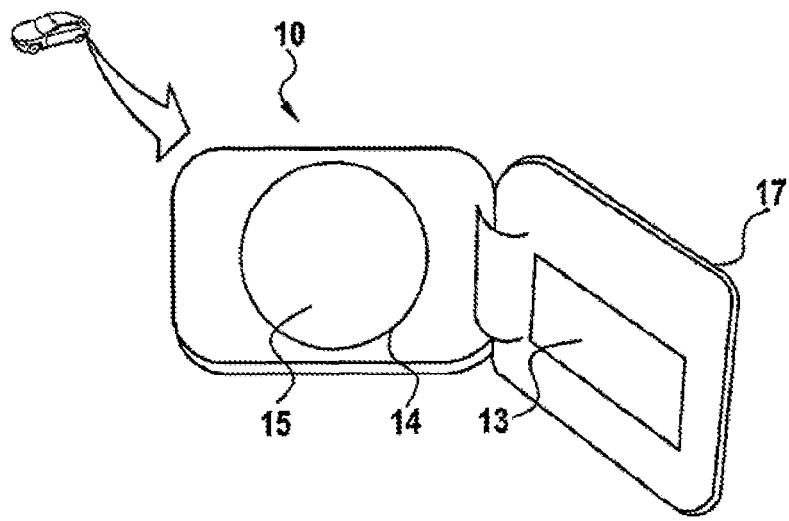
FIG. 2 shows a schematic illustration of the safety system according to the disclosure with a visual display, and a combination of an operating plug and a charging plug-in location.

FIG. 2 shows a schematic illustration of the safety system 10 according to the disclosure with a visual display, and a combination of the operating plug 15 and the charging plug-in location 14. FIG. 2 shows a flap 17 which has an operator control area 13. This operator control area 13 is a visual display on which information can be provided to the operators (emergency services or emergency personnel) such as, for example, instructions for the operator control of the safety system 10, or color signals, flashing signals and/or sound signals are output, in order, for example, to protect the vehicle 11 against misuse or theft. In this context, the visual display is composed of electrically nonconductive material. As a result, an electric shock from the battery 12 is avoided and safety is improved.

Furthermore, FIG. 2 shows a charging plug-in location 14 and an operating plug 15 for disconnecting the voltage of the battery 12, which charging plug-in location 14 and operating plug 15 are combined with one another. This means both that the vehicle 11 can be electrically charged with a plug-in location and disconnection of the voltage of the battery can be ensured with an operating plug 15. The safety system 10 displays the state of the system and outputs instructions and signals to service personnel, first-aiders or emergency services where necessary and thereby permits safe disconnection of the voltage of the vehicle. If the operating plug 15 is actuated/removed, the vehicle 11 is disconnected from voltages.

It is preferred to protect the safety system 10 against undesired switching on, for example, by virtue of the fact that the operating plug 15 can be removed in a way comparable to a tank cover from the filler neck. In addition, the operator control area 13 provides space for information and confirmations to the operators, for example, by means of a display which outputs instructions, color signals, flashing signals and/or sound signals in order, if necessary, to protect against misuse. This means that the removal of the operating plug 15 brings about a safe state since as a result the low-voltage circuit and the high-voltage circuit are disconnected. Undesired potential differences or else indeterminate states are therefore detected, and a safe state is brought about. In addition, the battery 12 can be disconnected by means of a signal interlock and/or supply interlock. For extreme exceptional cases or for recycling, there is the possibility of emergency discharge of the safety system 10. Necessary plug contacts, for example pilot contacts (interlock signals), are preferably used for charging the safety system 10, said pilot contacts being necessary in any case for charging the vehicle 11, for the flow of current or for plug-in monitoring.

Figure 3:
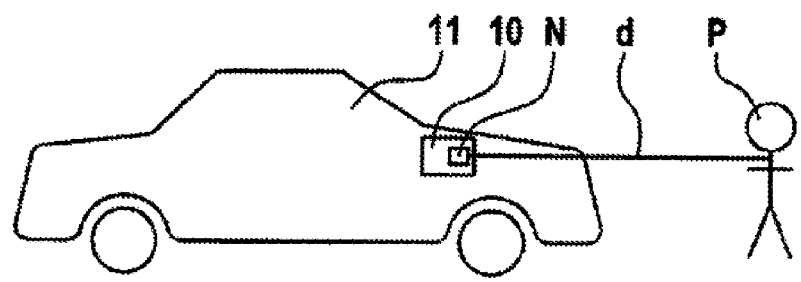
FIG. 3 shows a schematic illustration of the safety system according to the disclosure with a proximity sensor mounted on the vehicle.

FIG. 3 shows a schematic illustration of the safety system 10 according to the disclosure with a proximity sensor N which is mounted on the vehicle 11. The proximity sensor N can be an ultrasonic sensor or a radar sensor or an optical sensor, in particular a camera. According to a further advantageous refinement, the proximity sensor N can be a sensor which is already provided on the vehicle, for example a sensor of the parking assistant system or a distance sensor.

If an object, for example, a person P who is approaching the vehicle 11, is detected by means of the proximity sensor N, disconnection of the voltage of the vehicle 11 is brought about on the basis of the signal detected by the proximity sensor N. The voltage is preferably not disconnected until the person P reaches, or undershoots, a distance d from the vehicle 11 or approaches the vehicle 11 at a speed, wherein the value of the speed is above a specific threshold value.

An evaluation unit (not illustrated) is used to process the signal generated with the proximity sensor N.

The proximity sensor N can preferably be provided on the outer surface of the vehicle 11, in particular on its safety system 10. According to a further advantageous embodiment, the proximity sensor can be provided in a bumper (not illustrated) of the vehicle 11.

What is claimed is:
1. A safety system for a vehicle for reducing danger of an electric shock from a battery, comprising:
   an operator control area; and
   a charging plug-in location with an operating plug; and
   a contactor in the charging plug-in location that is operably connected to a low-voltage circuit and a high-voltage circuit of an electrical system of the vehicle, the contactor being configured to be (i) opened when the operating plug is removed from the charging plug-in location such that the low-voltage circuit is disconnected from the high-voltage circuit, and (ii) closed when the operating plug is plugged into the charging plug-in location such that the low-voltage circuit and the high-voltage circuit are connected,
   wherein the safety system is arranged on an outside of the vehicle.
2. The safety system according to claim 1, wherein the operator control area includes electrically nonconductive material.
3. The safety system according to claim 1, wherein the operator control area includes a visual display.
4. The safety system according to claim 1, wherein the operator control area includes visual monitoring for the detection of disconnection of the voltage.
5. The safety system according to claim 1, wherein the operator control area is arranged mirror-symmetrically with respect to the charging plug-in location.
6. The safety system according to claim 1, wherein the operator control area displays a state of the system and outputs at least one of color signals, flashing signals, and sound signals.
7. The safety system according to claim 1, wherein the operating plug and the battery are connected to a connecting unit.
8. The safety system according to claim 1, wherein the battery is disconnected by at least one of a signal interlock and a supply interlock.
9. The safety system according to claim 1, wherein a proximity sensor is mounted on the vehicle,
   wherein the safety system is configured to disconnect the low-voltage circuit from the high-voltage circuit in response to the proximity sensor detecting an object, and
   wherein the proximity sensor includes one of an ultrasonic sensor, a radar sensor, and an optical sensor.
10. The safety system according to claim 9, wherein the proximity sensor is an optical sensor, and
    wherein optical sensor includes a camera.
11. A motor vehicle comprising:
    a drive system of the motor vehicle;
    a battery connected to the drive system; and
    a safety system arranged on an outside of the motor vehicle, the safety system including
       an operator control area,
       a charging plug-in location with an operating plug, and
       a contactor in the charging plug-in location that is operably connected to a low-voltage circuit and a high-voltage circuit of an electrical system of the vehicle, the contactor being configured to be (i) opened when the operating plug is removed from the charging plug-in location such that the low-voltage circuit is disconnected from the high-voltage circuit, and (ii) closed when the operating plug is plugged into the charging plug-in location such that the low-voltage circuit and the high-voltage circuit are connected.
12. A method for reducing danger of an electric shock from a battery in a vehicle with a safety system having (i) an operator control area which can be operated from outside the vehicle, (ii) a charging plug-in location, and (iii) an operating plug, the method comprising:

removing the operating plug from the charging plug-in location to disconnect voltage of the battery,
wherein the removal of the operating plug opens a contactor to mechanically disconnect high-voltage and low-voltage current of the battery such that the battery is reliably disconnected from the vehicle in case of at least one of an accident and a system fault.

* * * * *